(12) United States Patent  
Moser

(10) Patent No.: US 8,896,998 B2
(45) Date of Patent: Nov. 25, 2014

(54) RECONFIGURABLE COMPUTER

(76) Inventor: George Moser, Redwood City, CA (US)

(*) Notice: Subject to any disclaimer, the term of this patent is extended or adjusted under 35 U.S.C. 154(b) by 292 days.

(21) Appl. No.: 13/564,747

(22) Filed: Aug. 2, 2012

(65) Prior Publication Data

US 2012/0293942 A1 Nov. 22, 2012

Related U.S. Application Data

(63) Continuation of application No. 12/634,672, filed on Dec. 9, 2009, now Pat. No. 8,264,829, which is a continuation-in-part of application No. 11/988,268, filed as application No. PCT/US2006/025399 on Jun. 29, 2006.

(60) Provisional application No. 60/734,652, filed on Nov. 9, 2005, provisional application No. 60/734,704, filed on Nov. 9, 2005.

(51) Int. Cl.
G06F 1/16 (2006.01)

(52) U.S. Cl.
CPC ............ *G06F 1/1616* (2013.01); *G06F 1/1637* (2013.01); *G06F 1/1654* (2013.01); *G06F 1/169* (2013.01)
USPC ....... 361/679.29; 345/173; 455/450; 248/121

(58) Field of Classification Search
USPC .......... 345/87, 156, 173, 204, 1.1, 168, 30, 8; 361/679.09, 679.29, 679.26, 679.27, 361/679.28, 679, 7, 679.17, 679.55, 679.06, 361/679.08, 679.21, 679.48, 679.57, 361/679.41, 679.15; 455/556.1, 552.1, 455/569.1, 557, 450, 566, 426.1, 418; 248/157, 158, 122.1, 398, 174, 121, 248/124.1, 371, 649, 295.11
See application file for complete search history.

(56) References Cited

U.S. PATENT DOCUMENTS

| 5,062,806 | A | | 11/1991 | Ohno et al. |
| 5,168,429 | A | * | 12/1992 | Hosoi ................... 361/679.09 |
| 5,193,069 | A | | 3/1993 | Furuya |
| 5,233,502 | A | | 8/1993 | Beatty et al. |
| 5,835,529 | A | * | 11/1998 | Koga et al. ................... 375/131 |
| 6,512,670 | B1 | | 1/2003 | Boehme et al. |
| 7,379,292 | B2 | | 5/2008 | Tsai et al. |

(Continued)

FOREIGN PATENT DOCUMENTS

| DE | 10211841 A1 | 10/2003 |
| KR | 10-0675427 B1 | 1/2007 |

OTHER PUBLICATIONS

United States Office Action, U.S. Appl. No. 12/856,686, filed Jul. 17, 2012, 18 pages.

(Continued)

*Primary Examiner* — Hung Duong
(74) *Attorney, Agent, or Firm* — Brad Bertoglio

(57) ABSTRACT

A portable computer system is provided having a base unit and a detachable display unit. The display unit can be oriented in landscape and portrait orientations, or can be replaced by display units having different physical characteristics. A support structure can be deployed to provide increased physical stability when desired.

6 Claims, 25 Drawing Sheets

(56) References Cited

U.S. PATENT DOCUMENTS

| | | |
|---|---|---|
| 2001/0011993 A1 | 8/2001 | Saarinen |
| 2002/0109662 A1 | 8/2002 | Miller |
| 2004/0190234 A1* | 9/2004 | Lin et al. .................. 361/681 |
| 2004/0246666 A1* | 12/2004 | Maskatia et al. ............ 361/683 |
| 2008/0062625 A1 | 3/2008 | Batio |
| 2011/0063785 A1 | 3/2011 | Yamagiwa et al. |
| 2011/0199319 A1 | 8/2011 | Moser |
| 2011/0199726 A1 | 8/2011 | Moser |

OTHER PUBLICATIONS

United States Office Action, U.S. Appl. No. 12/856,687, filed Jul. 2, 2012, 6 pages.

PCT International Search Report and Written Opinion, PCT/US2006/025399, Jul. 11, 2007, 6 pages.

* cited by examiner

Figure 1  State of the Art

RECONFIGURABLE COMPUTER

This is a continuation application of pending prior U.S. patent application Ser. No. 12/634,672 filed Dec. 9, 2009; which is a continuation-in-part application of U.S. Pat. No. 7,656,652, issued Feb. 2, 2010 and based on U.S. patent application Ser. No. 11/988,268 filed on Jan. 4, 2008; which is a national stage of PCT International Application No. PCT/US2006/025399 filed on Jun. 29, 2006; which claims priority of U.S. Provisional Application No. 60/734,652 filed on Nov. 9, 2005, and U.S. Provisional Application No. 60/734,704 filed on Nov. 9, 2005.

BACKGROUND OF THE INVENTION

The present invention relates in general to the computer field, and in particular, to a portable computer that can easily be adjusted to different and varying user needs by changing its configuration.

Current portable computers are often designed using a clamshell configuration, which includes a base portion with a computer keyboard, connected at one edge to a display portion via a hinge mechanism. While the user is able to tilt the angle of the display, the display is otherwise fixed in relationship to the base unit.

The display portion of such clamshell portable computers typically has a fixed aspect ratio, in which the width of the display is greater than its height. Many conventional displays employ a 4:3 aspect ratio. Other displays provide various "widescreen" aspect ratios, such as 16:9. Such aspect ratios, having width greater than height, are sometimes referred to as "landscape" configurations.

While landscape display configurations may be efficient for some applications, there are other applications for which it may be desirable to employ a display configuration having a height greater than its width, i.e., a "portrait" display configuration. However, since many portable computers have a display with a fixed orientation, users may be forced to use a landscape display orientation, even for applications in which a portrait configuration would be more effective. For example, many of the standard papers sizes for printed documents have heights greater than their widths. For users creating or reviewing documents formatted for printing on such papers, a portrait display configuration may provide more efficient use of the display area. Therefore, in some circumstances, it may be desirable to provide a portable computer having a portrait display configuration, while other circumstances may call for a landscape display orientation. It may also be desirable to enable a user to select between landscape and portrait display configurations based upon the task presently at hand. Thus, in accordance with one aspect of some embodiments of the invention, a portable computer is provided having a display that can be readily changed between landscape and portrait configurations. Such a configurable display may enable a computer to improve a user's satisfaction and productivity in connection with a wide variety of applications.

Because portable computers typically have a fixed display, users are often forced to choose between a small computer which is highly portable but saddled with a small display having limited display area, and a larger computer having greater display area but a correspondingly larger size and reduced portability.

Several attempts have been made to provide a portable computer with the ability to rotate the display so that he user can switch between display and portrait viewing mode. Those attempts have found little acceptance, often suffering from some combination of complexity, weight, high cost and lack of reliability. However, significant productivity improvements may be achieved by matching the user's application with the correct viewing mode. The widespread use of such applications and computers worldwide provides significant opportunities for enhanced productivity.

In addition to changing the computer's configuration to allow for different viewing formats (portrait and landscape), this invention allows the user to use different screen with different sizes on the same computer base.

SUMMARY OF THE INVENTION

In accordance with one aspect of the invention, a portable computer system includes a base unit and a plurality of detachable display units, each of which can be attached to the base unit. Each of the display units can have different physical characteristics, such as size, aspect ratio and display technology. Extra-wide aspect ratios can be provided, such as displays having widths that are at least 2 times or at least 2.5 times their height in a landscape orientation.

In accordance with another aspect of the invention, a portable computer system with detachable displays can contain a support structure selectively extended or retracted for increased stability. In one embodiments, the support structure comprises beams that can be extended or retracted from each rear corner of the base unit. In another embodiment, the support structure may comprise a tray that can be extended from the rear of the base unit. The tray may be generally oriented in a manner that is coplanar with the bottom surface of the base unit.

In accordance with another aspect of the invention, a portable computer may include a tray that can be extended and retracted, or deployed, laterally from the side of the base unit. The tray can have a top surface adapted for contact with a computer pointing device, such as a mouse. Such a mouse may include a magnetic component, and the tray may include ferromagnetic components, such that the mouse is magnetically attracted to the tray.

The portable computer may also include a panel on the top surface of the base unit. The panel may have a surface adapted for operation of a computer mouse. The panel may also include a computer pointing device movably affixed thereto via a mechanical linkage or magnetic attraction. Such a pointing device may have a concave top surface adapted for contact with the tip of a user's finger. Such a pointing device may also have a bottom surface with a surface area less than the surface area of the top surface or the area of the user's finger on the top surface of the pointing device. The panel may also or alternatively be responsive to touch or proximity of a physical object other than a human finger, such as a pen-shaped instrument with a rolling or sliding tip.

In accordance with another aspect of the invention, a portable computer can be provided having a receptacle for removable insertion of a user's cellular telephone, whereby the cellular telephone can be accessed by the computer when inserted to provide access to the Internet for the computer via the cellular telephone's service connection.

DETAILED DESCRIPTION OF THE DRAWINGS

Figure 1:
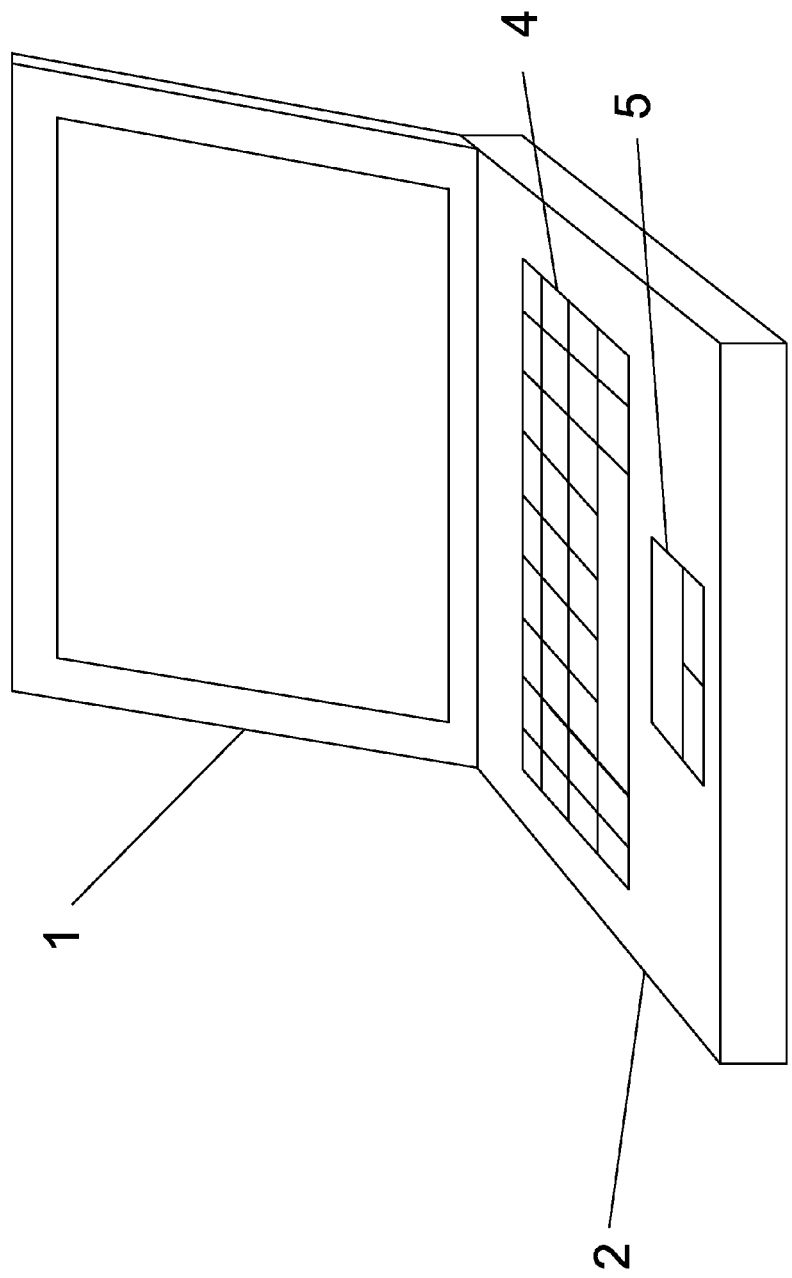
FIG. 1 is a perspective view of a prior art portable computer

While this invention is susceptible to embodiment in many different forms, there are shown in the drawings and will be described in detail herein several specific embodiments, with the understanding that the present disclosure is to be considered as an exemplification of the principles of the invention and is not intended to limit the invention to the embodiments illustrated.

FIG. 1 shows a conventional portable computer. The base 2 contains a keyboard 4 and a touch panel 5. The LCD display 1 is rotatably attached to the base. This is the state of the art approach, and it is being used in virtually all currently manufactured laptop PCs.

Figure 2:
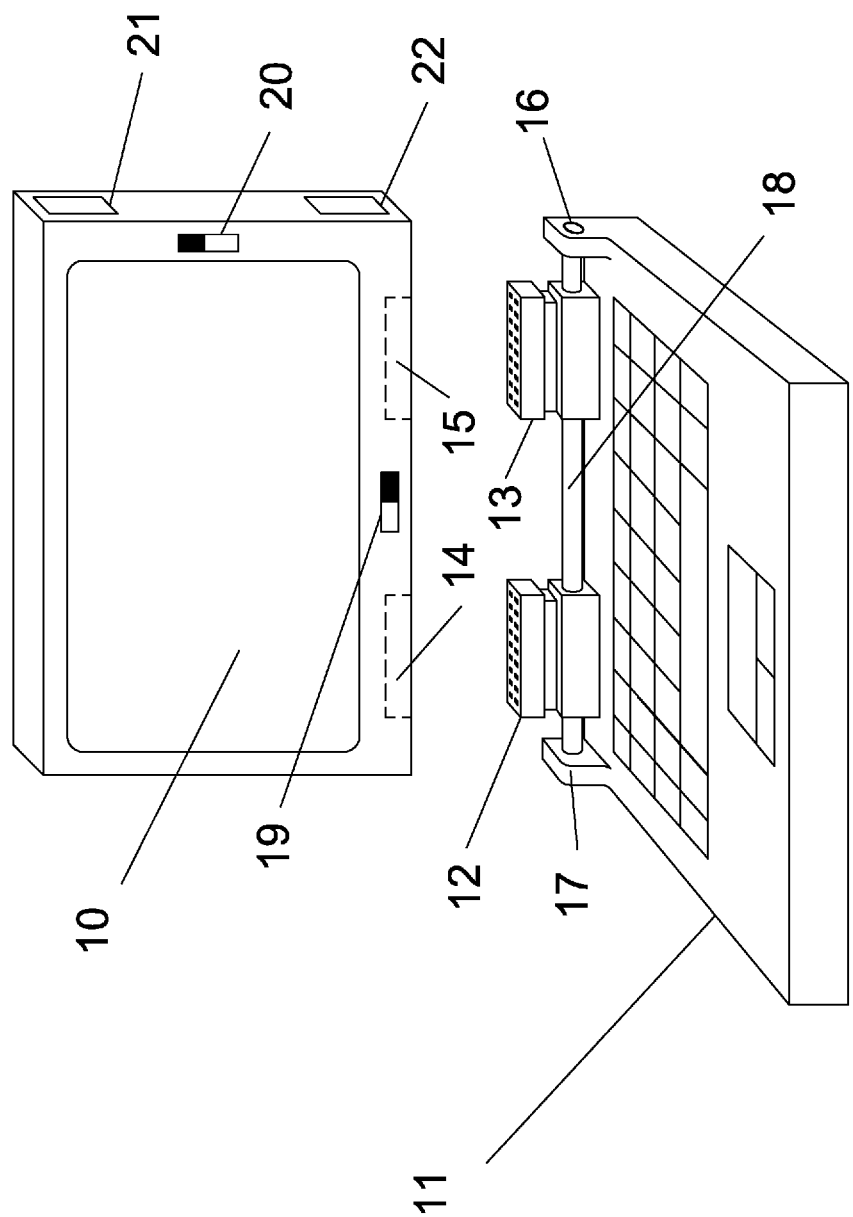
FIG. 2 is a perspective view of a portable computer having a detached display panel, in accordance with one embodiment of the present invention.

FIG. 2 shows an embodiment of the invention. The LCD display 10 connects with the base 11 by means of connector tabs 12 and 13 which mate with receptacle cavities 14 and 15 respectively. The shaft 18 is rotatably supported by friction hinges 16 and 17, which allow the user to change the tilting angle of the screen for his or her comfort and desired viewing angle. The tabs 12 and 13 are synchronized and aligned in their angular position by the shaft 18, so that they both point in the same direction at all times, making it easy for the user to plug the screen into the base. Once the screen is plugged in, the user can slide the latch 19 to secure the screen in place.

The preceding description applies to the landscape orientation of the screen. For the portrait orientation, receptacle cavities 21 and 22 mate with connector tabs 13 and 12, respectively, and latch 20 is used to secure the screen in place.

The tabs 12 and 13 provide both the mechanical coupling of the screen with the base, as well as the electrical connection between screen and base. This electrical connection is used to transmit both electrical power to the screen as well as the signals that generate the image displayed on the LCD panel.

While it is understood that differing numbers of tabs can be utilized in connection with the present invention, the dual tab configuration of FIG. 2 may be particularly advantageous in many application due to its mechanical sturdiness and reliability, and the ease of operation by the user.

Figure 3:
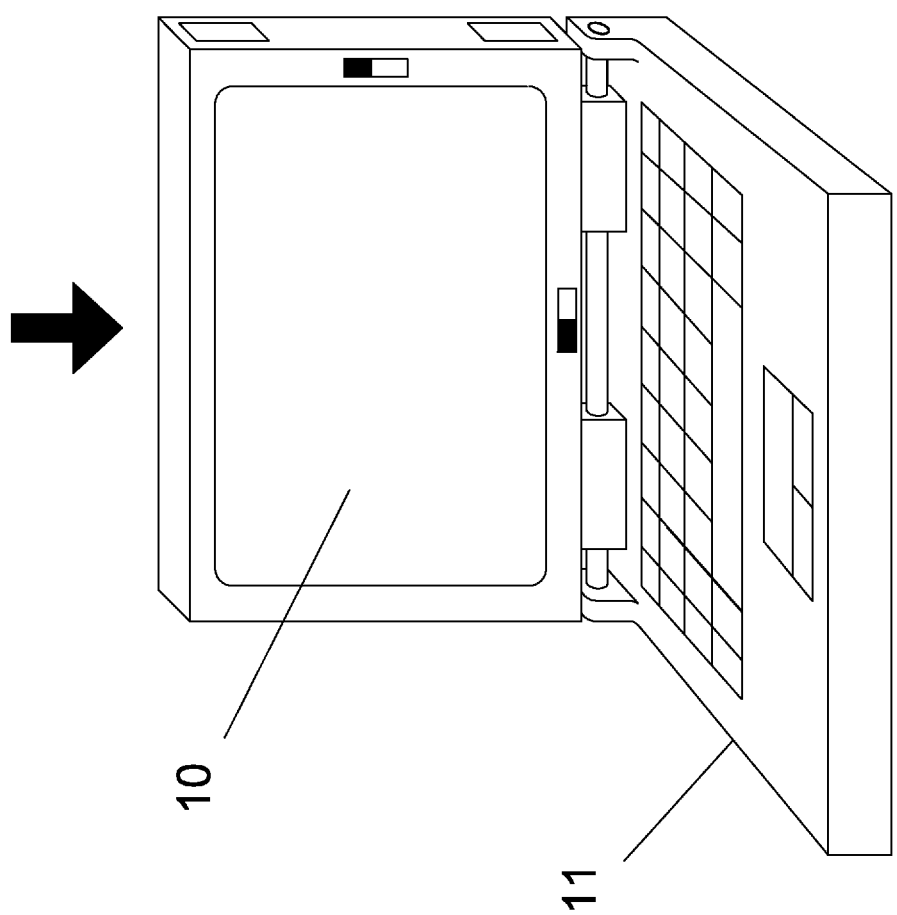
FIG. 3 is a perspective view of the portable computer of FIG. 2, in which the display panel is engaged in a landscape orientation.

FIG. 3 shows screen 10 of the embodiment of FIG. 2, after screen 10 has been plugged into base 11.

Figure 4:
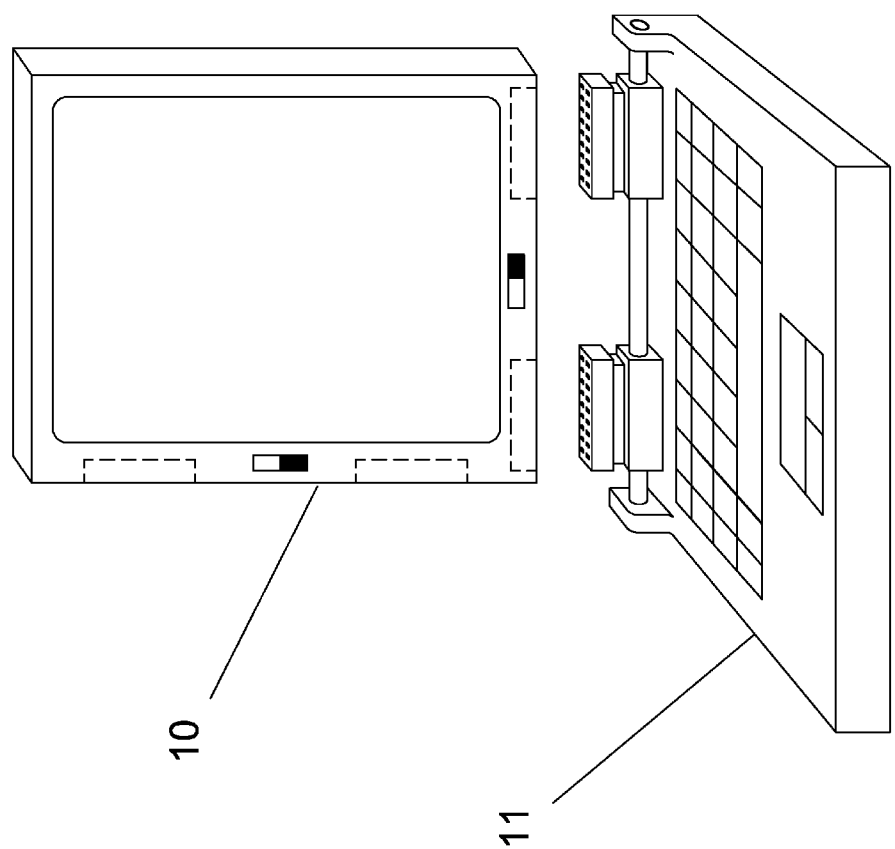
FIG. 4 is a perspective view of the portable computer of FIG. 2, in which the display panel is detached and oriented in a portrait orientation.

FIG. 4 shows the screen 10 aligned for engagement with base 11 in a portrait orientation, using the dual tab configuration.

Figure 5:
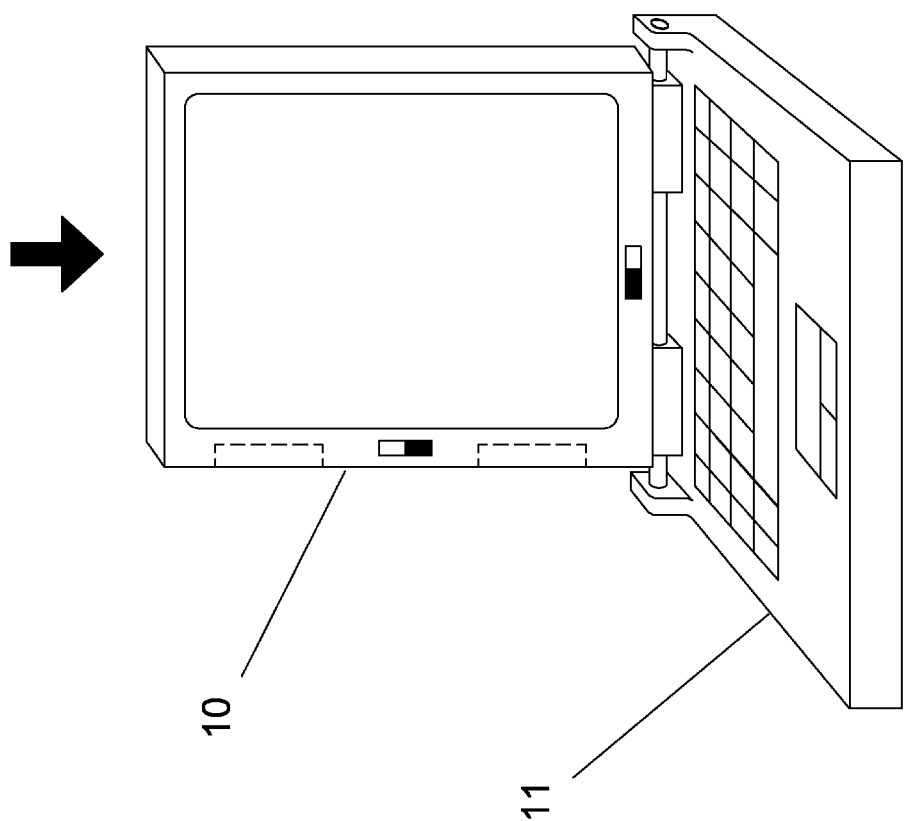
FIG. 5 is a perspective view of the portable computer of FIG. 4, in which the display panel is engaged in a portrait orientation.

FIG. 5 shows screen 10 after it has been inserted and secured to base 11 in a portrait orientation.

Figure 6:
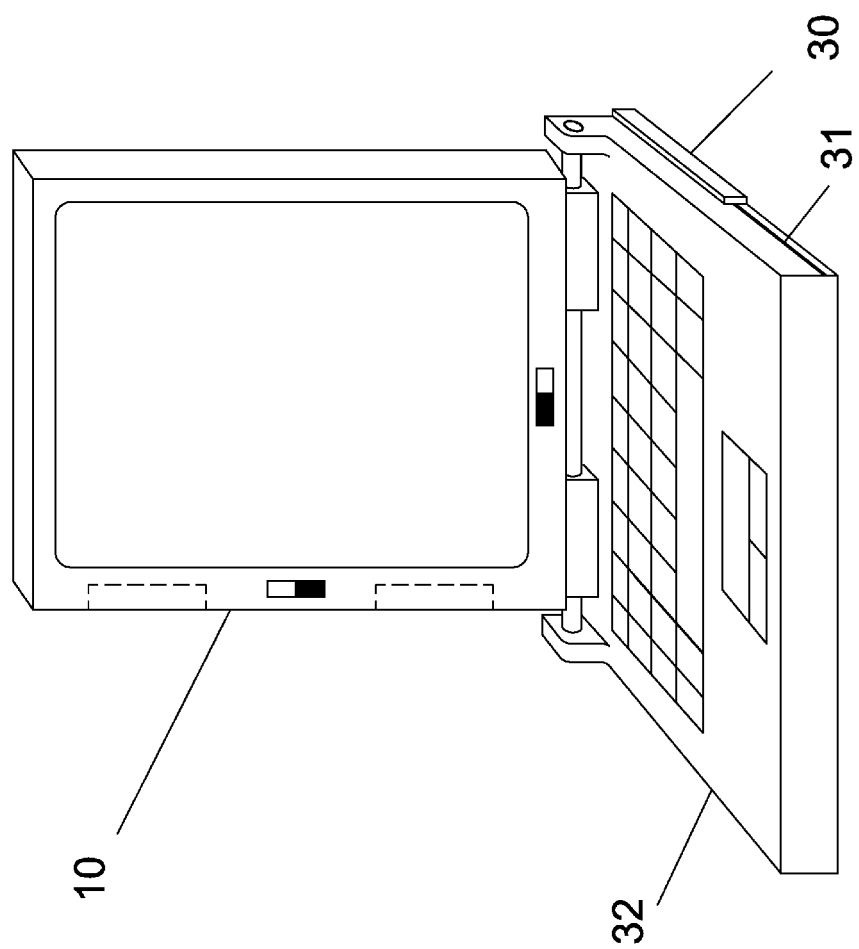
FIG. 6 is a perspective view of a portable computer, having a support structure in a stowed position, in accordance with another embodiment of the invention.

One possible issue when switching from landscape to portrait orientation is that the increased height of the screen can shift the center of gravity of the computer, potentially making the computer unstable. FIG. 6 illustrates another embodiment of the invention, which addresses that issue.

In the embodiment of FIG. 6, screen 10 can be removably attached to computer base 32. Base 32 includes slidable support beams 30, attached to both lower rear sides of base 32. Support beams 30 are slidably engaged with grooves 31, such that they can be moved into a stowed position or deployed position. In a stowed position, support beams 30 are maintained substantially within the perimeter of base 32. In a deployed position, support beams 30 extend outwards from the rear edge of base 32. Support beams 30 can be moved into a deployed position to provide added stability to base 32 when the bottom of base 32 is resting on a surface.

Figure 7:
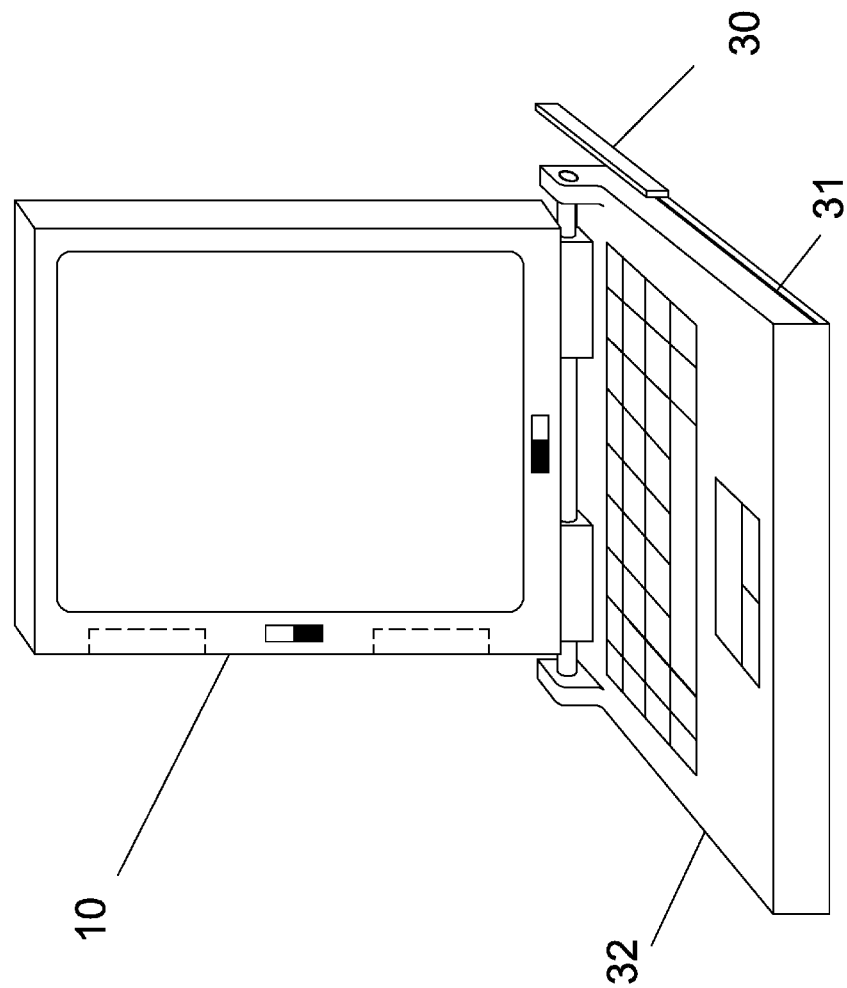
FIG. 7 is a perspective view of the portable computer of FIG. 6, in which the support structure is in a deployed position.

FIG. 7 illustrates the embodiment of FIG. 6, in which display 10 is engaged with base 32 in a portrait orientation, and support beams 30 are deployed, stabilizing the computer and reducing its likelihood of tipping backwards.

Figure 8:
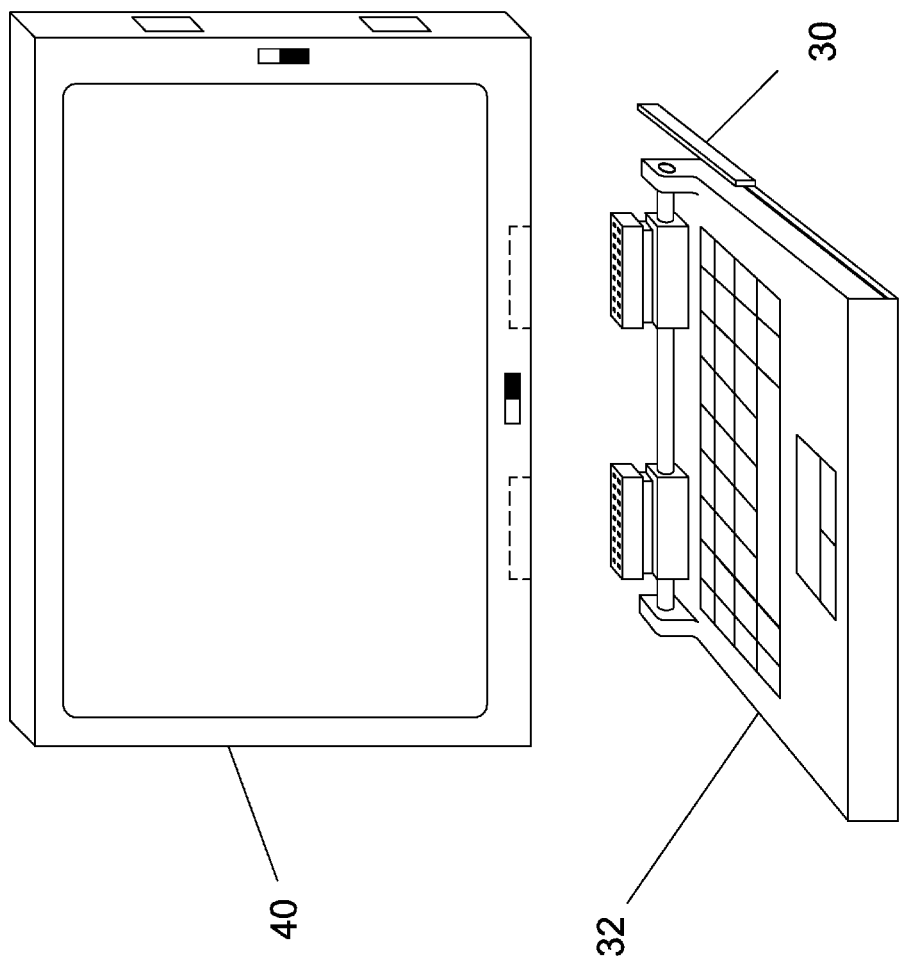
FIG. 8 is a perspective view of a portable computer having an oversized detachable display with deployed support structures.

FIG. 8 illustrates another embodiment of the invention, in which a large screen can be engaged with a comparatively small base while still maintaining stability of the computer. Large screen 40 is oriented for engagement with base 32, with support beams 30 oriented in a deployed configuration. This capability enables a user to travel with a small screen and small base, while using a larger screen with the same base when working in the office or home. For instance, base 32 may comprise a small netbook computer, which is comfortably used with a small screen while traveling to check emails and perform simple word processing. Later back in the office, a user of base 32 can switch to large screen 40 for enhanced productivity using applications that require greater display size.

Figure 9:
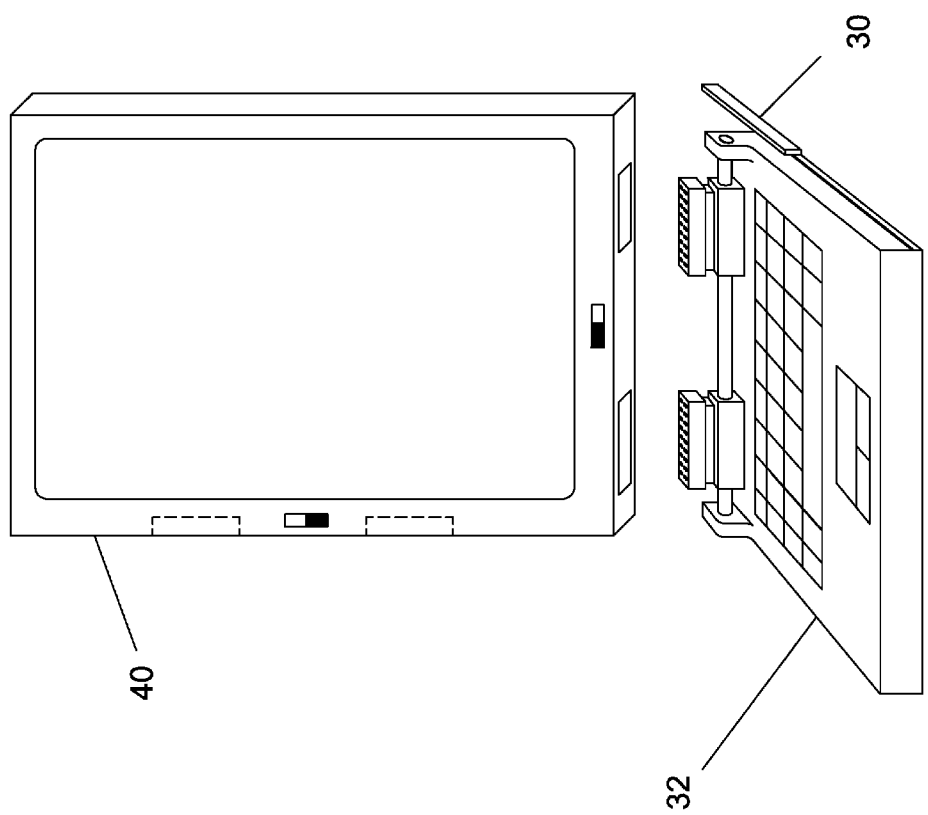
FIG. 9 is a perspective view of a portable computer having an oversized detachable display in a portrait orientation with deployed support structures.

The use of deployable support beams 30 may be particularly advantageous when using a screen that is relatively large compared to base 32, configured in a portrait orientation, further extending the computer's center of gravity away from the plane of base 32. Such a configuration is illustrated in FIG. 9, when large oversized screen 40 is positioned in portrait orientation relative to base 32. The support beams 30 provide added stability to facilitate use of the computer in this configuration.

Figure 10:
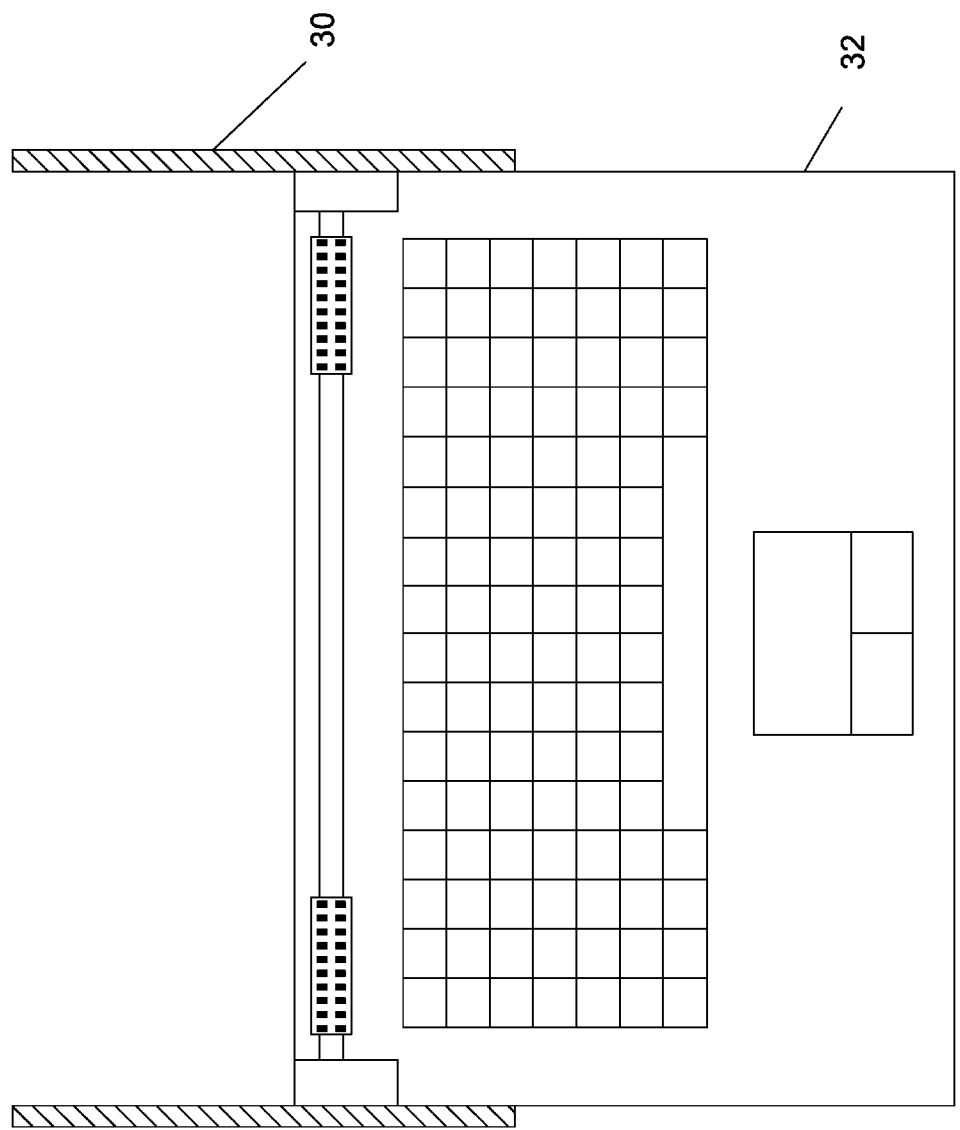
FIG. 10 is a top view of a portable computer having an oversized detachable display in a portrait orientation with deployed support structures.

FIG. 10 is a partial top plan view of the portable computer of FIG. 9 (with the screen unit removed for clarity) which shows deployed support beams 30 at each side of the base unit.

Figure 11:
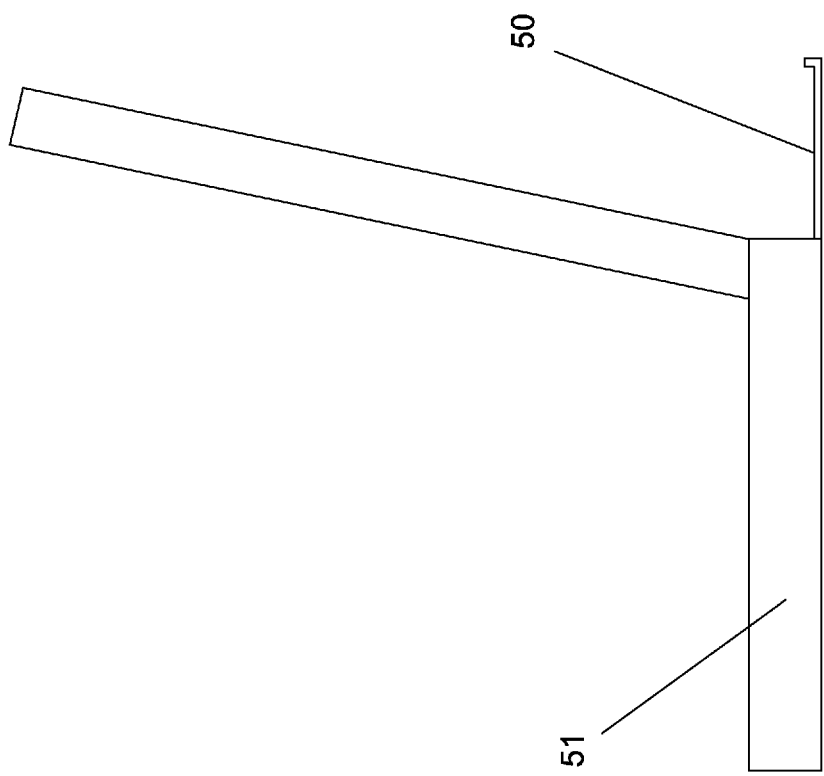
FIG. 11 is a side elevation of a portable computer having a deployed tray support structure, in accordance with another embodiment of the invention.
Figure 12:
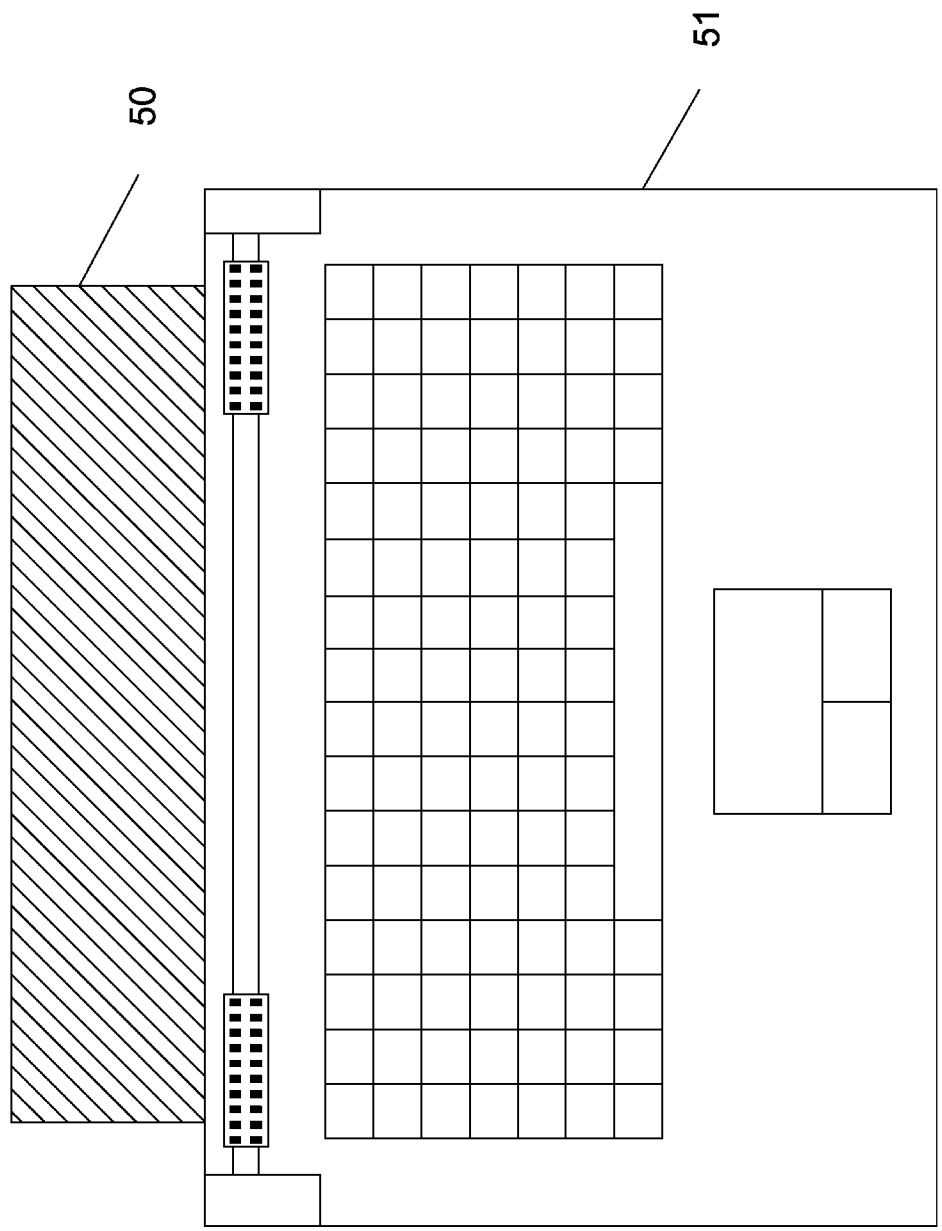
FIG. 12 is a top view of a portable computer having a deployed tray support structure, in accordance with another embodiment of the invention.

While the embodiments of FIGS. 6-10 illustrate support structures that include beam components slidably-engaged with groove structures in a base unit, other support structures and means of moving the support structure relative to a computer base or computer screen can be readily employed in other embodiments of the invention. FIG. 11 illustrates such an alternative support structure. In FIG. 11, base 51 includes a support structure which includes tray 50, which is a flat structure coplanar with base 51, and which can be alternatively extended or retracted from the rear portion of base 51. FIG. 12 shows a top view of the computer base (without screen for clarity) with its tray support structure deployed.

Support structures such as beams 30 and tray 50 can also equipped with a detent mechanism to secure the beam or tray at desired positions relative to base 32 and 51, respectively. In some embodiments of the invention, the detent may consist of a fastener, such as a screw, nut or wingnut, adapted to mechanically secure the support structure in a desired position relative to the base unit.

Figure 13:
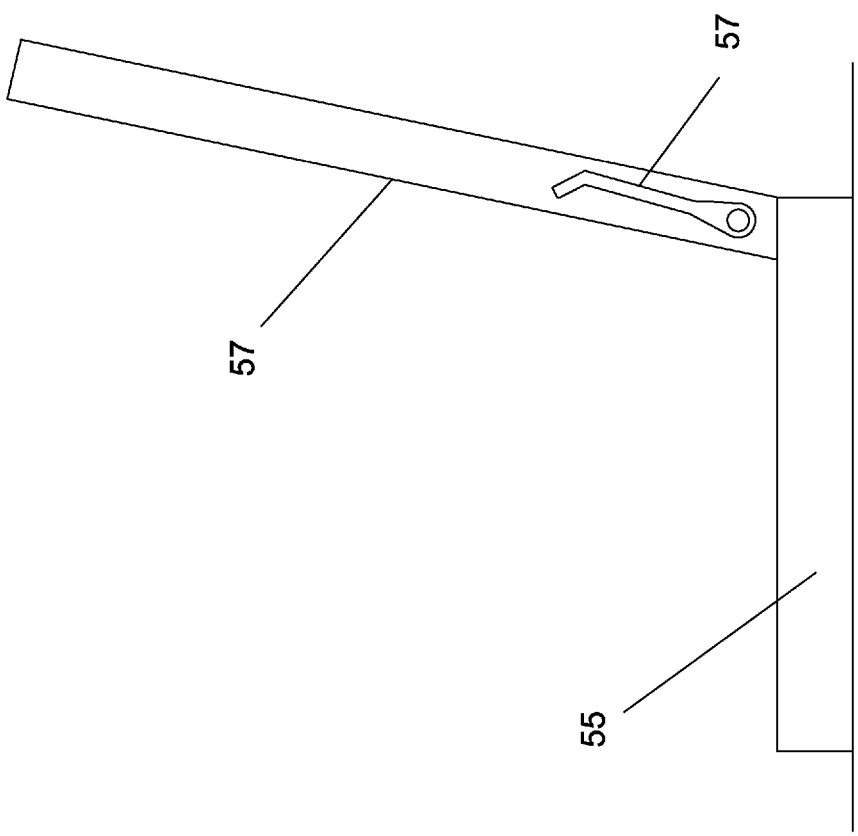
FIG. 13 is a side view of a portable computer having a support structure integrated into the screen unit, shown in a stowed position, in accordance with another embodiment of the invention.
Figure 14:
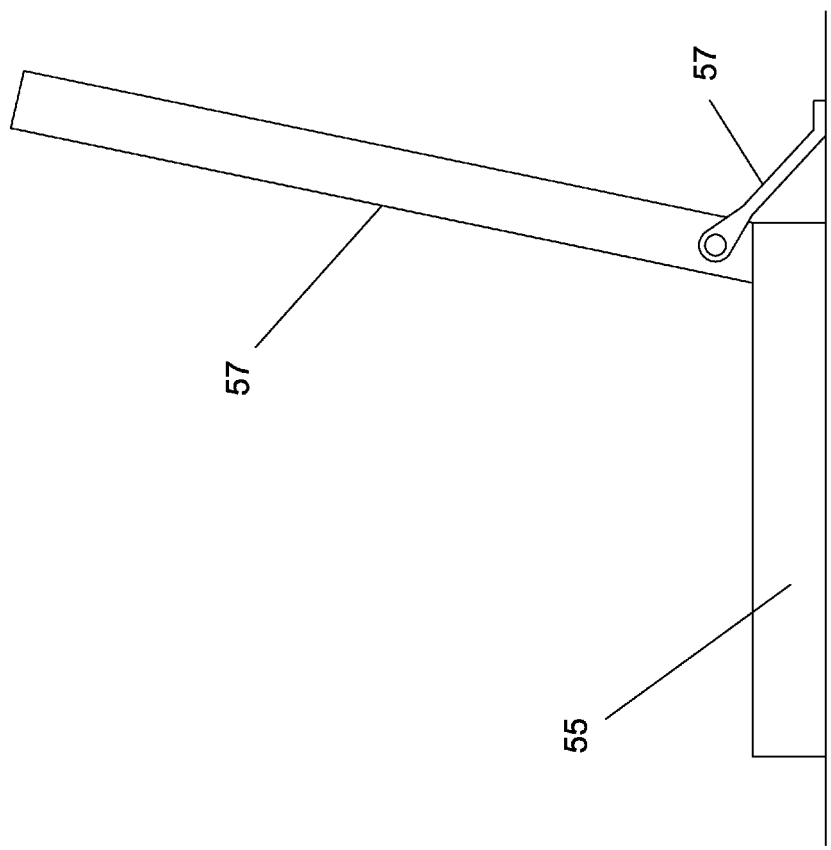
FIG. 14 is a side view of a portable computer having a support structure integrated into the screen unit, shown in deployed position, in accordance with another embodiment of the invention.

In other embodiments, a support mechanism can be movably engaged with the screen as opposed to the base. FIGS. 13 and 14 show one embodiment of such a mechanism. Support arms 57 are rotatably secured to the sides of display 57 via a hinge mechanism near its bottom end. In the stowed position, illustrated in FIG. 13, support arms 57 are aligned adjacent the sides of screen 57. In a deployed position, illustrated in FIG. 14, support arms 57 are rotated downwards, away from screen 57, such that the far end of support arm 57 is approximately coplanar with the bottom of base unit 55, thereby providing added stability and helping prevent the portable computer from tipping backwards.

Figure 15:
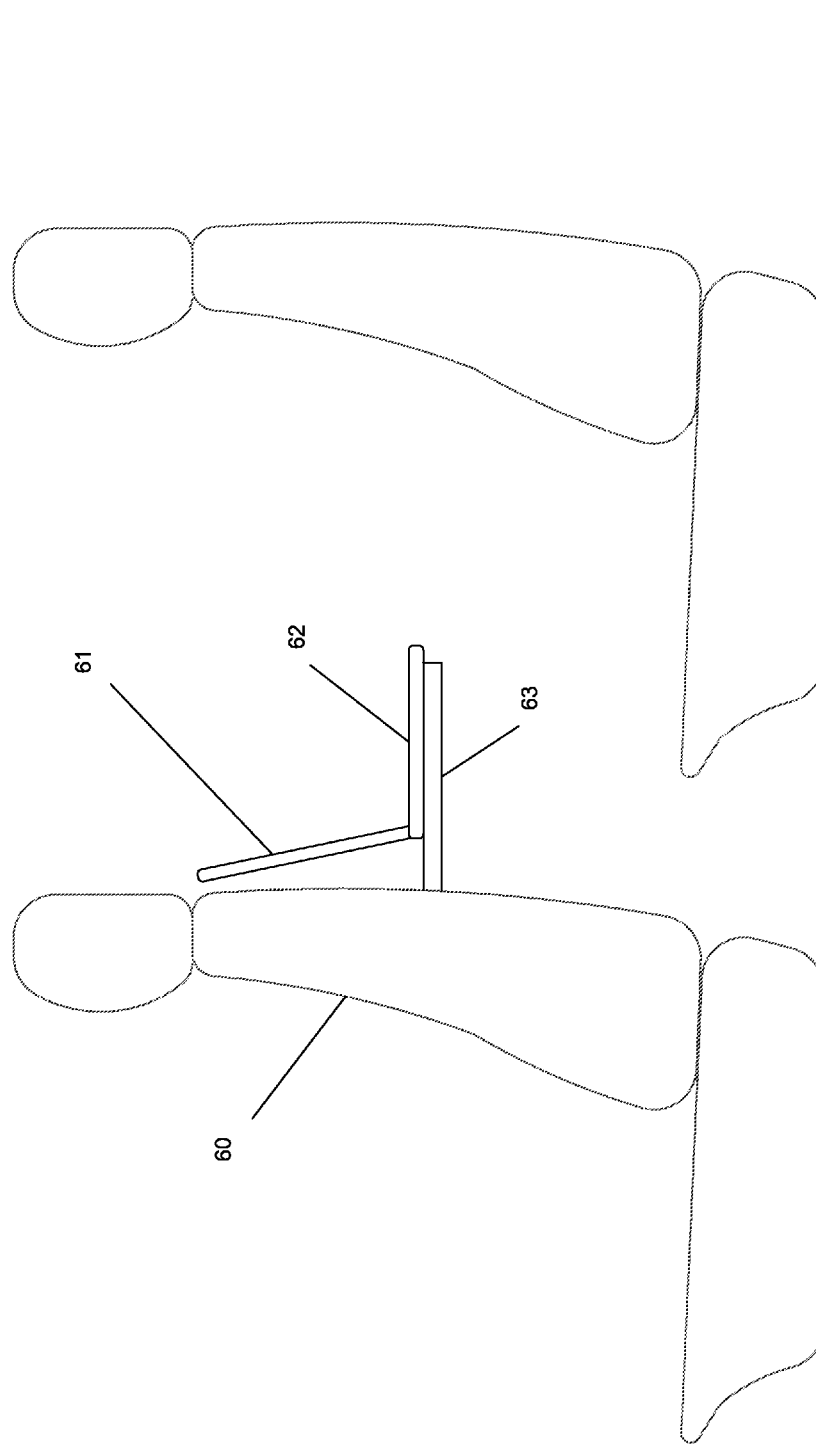
FIG. 15 is a side elevation of an airplane seating arrangement with a conventional portable computer resting on a tray table, in which the forward seat is in its upright position.
Figure 16:
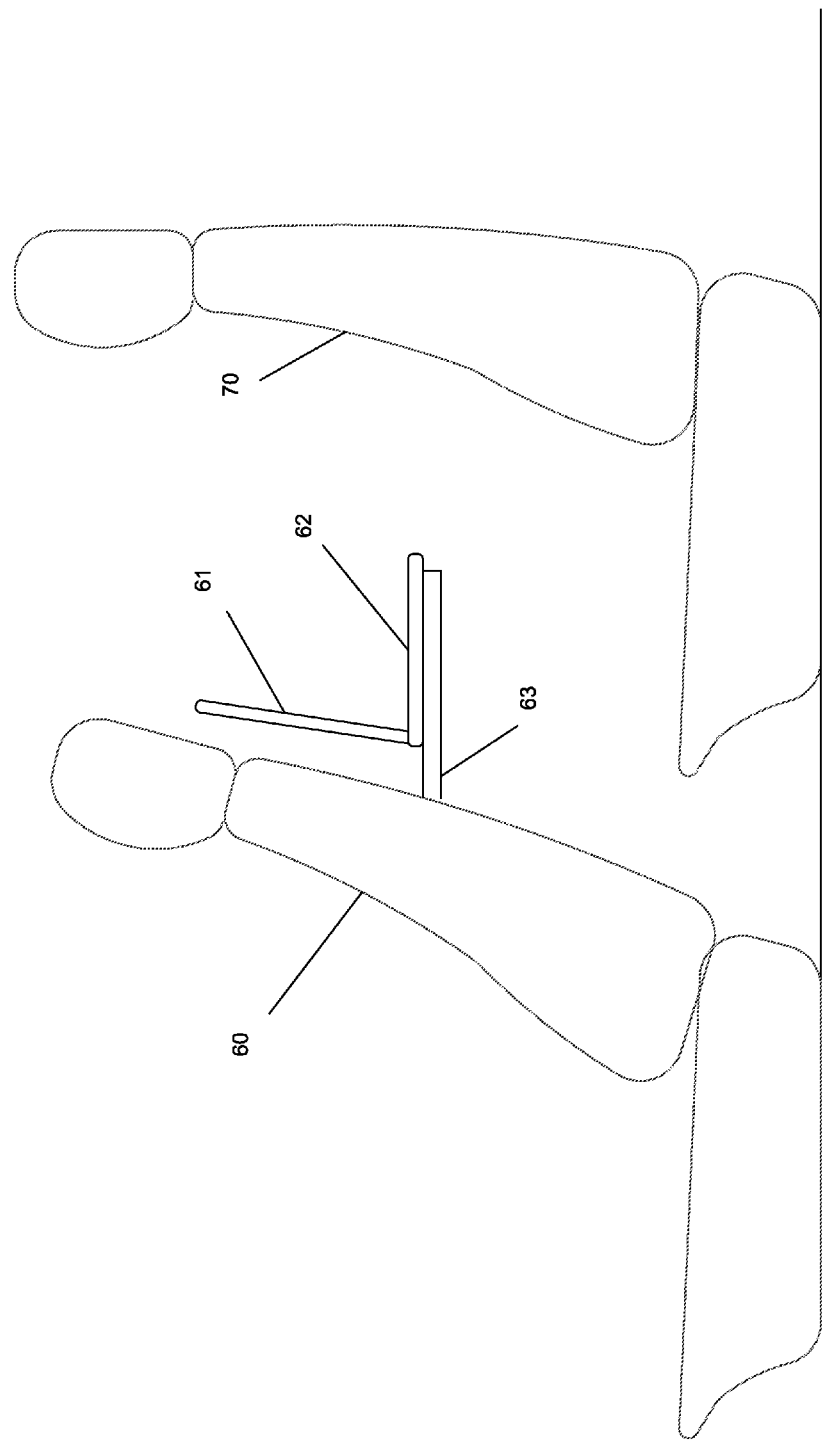
FIG. 16 is a side elevation of an airplane seating arrangement with a conventional portable computer resting on a tray table, in which the forward seat is in its reclined position, making it difficult to use the portable computer because of lack of space to open it enough for a desirable viewing angle.

Some embodiments of the present invention may be particularly advantageous for use during air travel. FIG. 15 shows a common problem during air travel. The passenger tray 63 is attached to seat 60. The laptop consisting of base 62 and standard size screen 61 rests on the tray 63. As illustrated in FIG. 16, when seat 60 is reclined, a passenger sitting on seat 70 find him/herself compressed between the laptop computer and his seat, which can be very uncomfortable. In addition, the change in angle between tray 63 and the back of seat 60 makes it difficult or impossible to open laptop screen 61 to an angle sufficient for good viewing. Instead, a user is forced to work with his laptop screen at a much smaller angle in order for the laptop to still fit on the tray. The tight space may make it almost impossible to use the laptop in such a situation.

Figure 17:
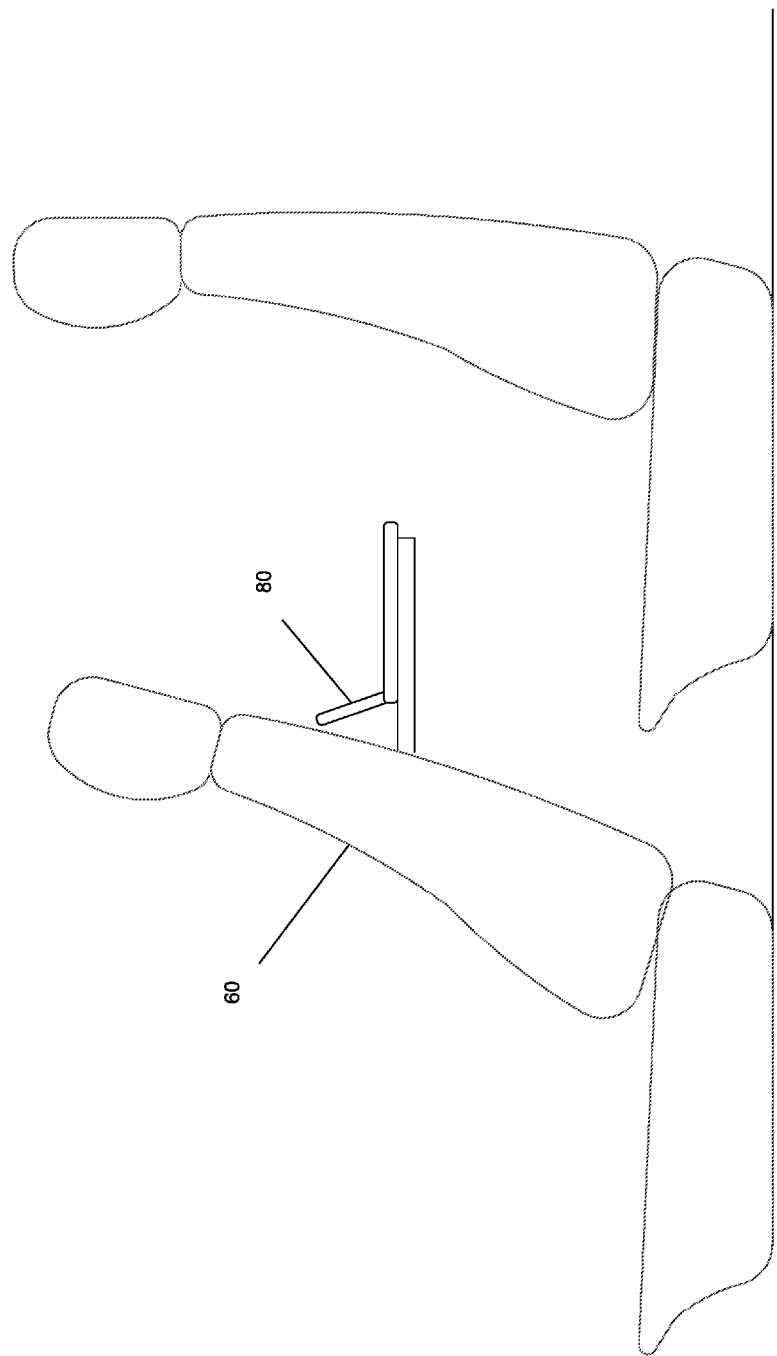
FIG. 17 is a side elevation of an airplane seating arrangement with a portable computer resting on a tray table, in which the forward seat is reclined, and in which a detachable low height display is attached to the portable computer base unit.

FIG. 17 shows a solution to the problem illustrated in FIG. 16, using an embodiment of the present invention. Standard size screen 61 is exchanged for extra low screen 80, using the dual tab interconnect apparatus illustrated in FIGS. 6-10. In the embodiment of FIG. 17, extra low screen 80 is substantially lower than a regular screen such as 61 in FIG. 16. Extra low screen 80 can also have a special aspect ratio. Whereas current commercial laptops typically have a screen aspect ratio of width to height of either 4:3 or 16:9, the width of extra low screen 80 in landscape position is preferably at least two times the height of screen 80, and optionally at least 2.5 times the height of screen 80.

Because of its low height, screen 80 can display only a limited number of lines and a limited amount of information. However, such a screen size will often be sufficient for applications required while traveling in an airplane. An advantage of some such embodiments is to be able to optimally set the viewing angle and work comfortably even in tight airplane seat. The reduced height of extra low screen 80 allows screen 80 to be opened to a greater angle than standard size screen 61, without interfering with front seat 60. Such an extra low screen would probably not be convenient for everyday use, but the reconfigurable concept of this invention allows the user to swap it with a normal size or oversized screen after returning from the trip.

Figure 18:
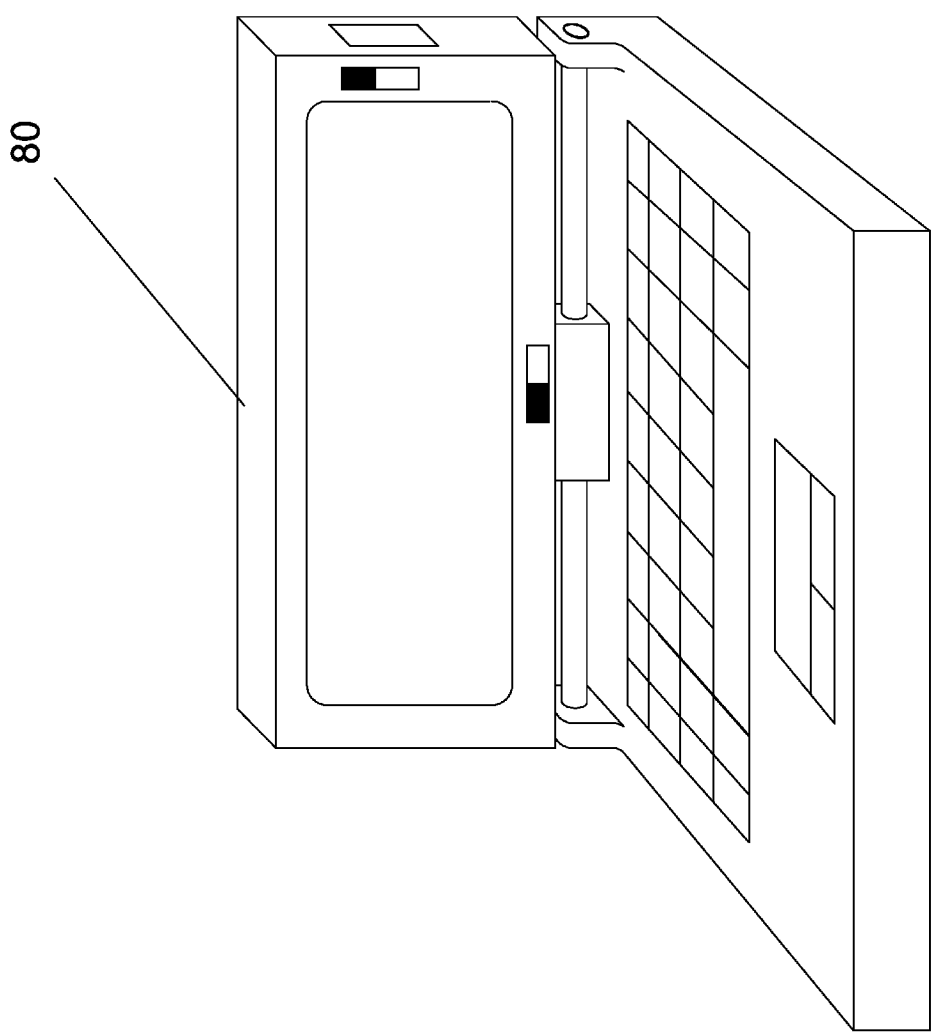
FIG. 18 is a perspective view of the portable computer of FIG. 17.

FIG. 18 shows a front perspective view of a reconfigurable computer configured with extra low screen 80 for travel. In addition to providing different display sizes or aspect ratios, it is also contemplated that displays can be interchanged to provide displays having different technologies that may be desirable for different applications, such as transmissive LCD technologies, reflective LCD technologies, electrophoretic display technology, electrowetting display technology or electrofluidic display technology.

Figure 19:
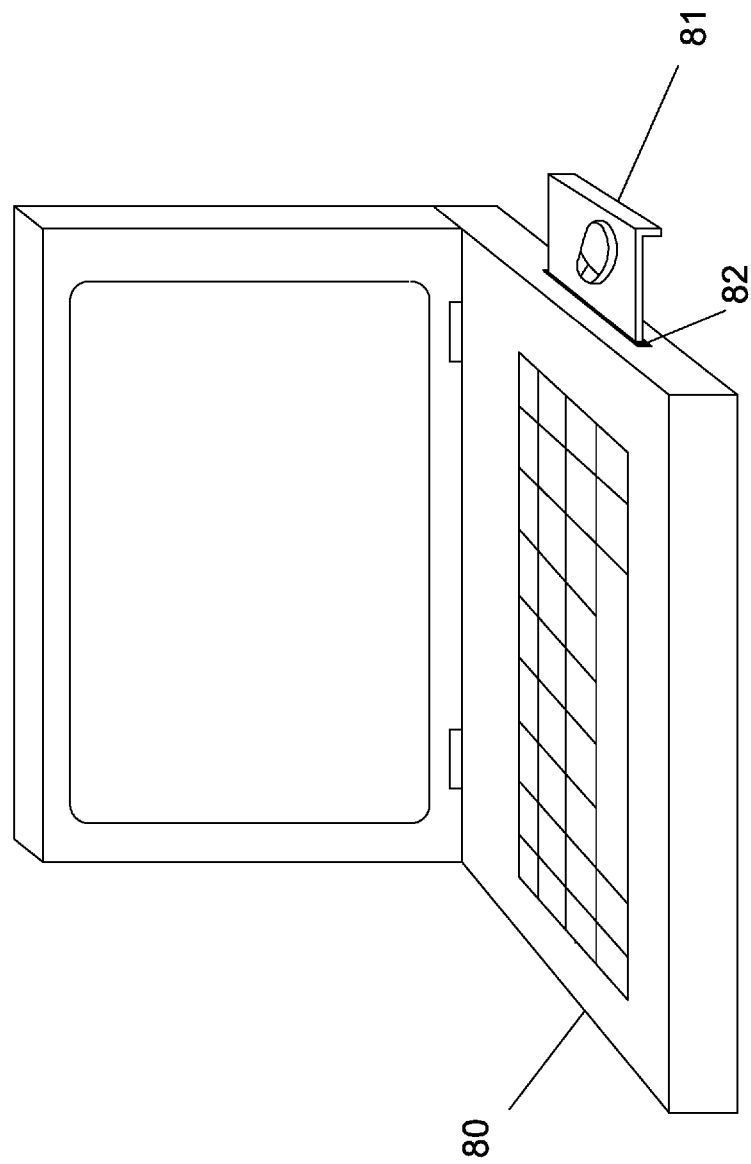
FIG. 19 is a perspective view of a portable computer having a retractable mouse tray oriented in an extended position, in accordance with another embodiment of the invention.

FIG. 19 shows another typical problem for mobile computer users: to work most efficiently it is often necessary to use a mouse, yet many vehicle seats (such as airplane seats, car seats, train seats, or the like) do not provide an appropriate surface to use the mouse. The seat trays in airplanes are often smaller than the laptop base, and trying to slide a mouse on the seat or the arm of the seat can be very difficult and frustrating. The embodiment of FIG. 19 illustrates a reconfigurable computer option to deal with that problem. Tray 81 can be extended laterally from laptop base 80, providing a relatively flat surface, well-positioned for use of a mouse. Tray 81 can be inserted into and extracted from computer base 80 via slot 82. Slot 82 may optionally include a detent mechanism which engages tray 81 to secure tray 81 in a desired position relative to base 80.

Figure 20:
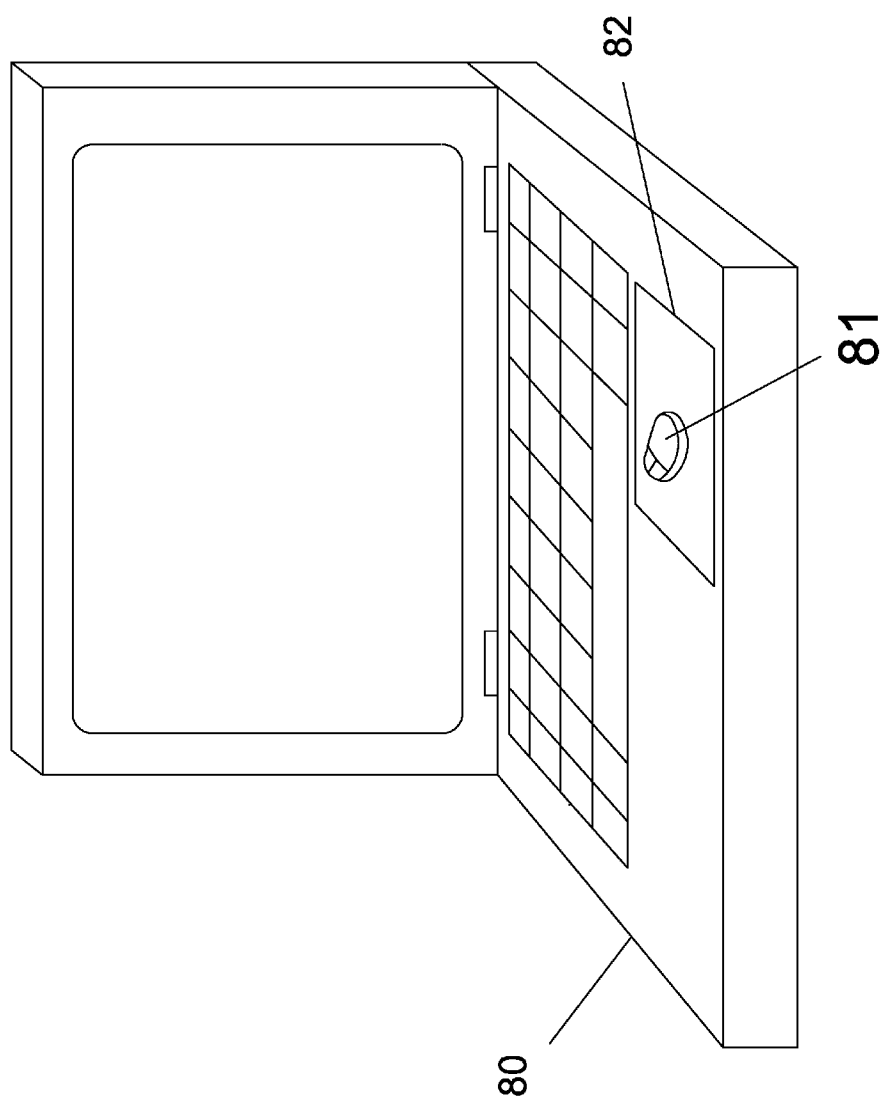
FIG. 20 is a perspective view of a portable computer having a mouse panel integrated into the top surface of the portable computer base, in accordance with another embodiment of the invention.

While the solution to the mouse problem shown in FIG. 19 may be sufficient in many cases, in other circumstances, alternative embodiments may be desirable. One such alternative embodiment is illustrated in FIG. 20. Laptop computer base 80 includes mouse panel 82, provided on the top surface of base 80. Panel 82 is comprised of a surface material suitable for operation of mouse 81, which materials are well-known in the art of traditional standalone mouse pads. Panel 82 may be dedicated for use with mouse devices, or alternatively, panel 82 may be a touch-sensitive panel which can be alternatively utilized as a standalone pointing device when mouse 81 is not present. Optionally, panel 82 may be comprised of ferromagnetic material, in which case mouse 81 may include a small magnet to promote continuous contact between mouse 81 and panel 82. Preferably, any magnetism associated with mouse 81 will be sufficiently weak to prevent any damage to any hard disk drives or other magnetic data storage media residing within base 80.

Figure 21:
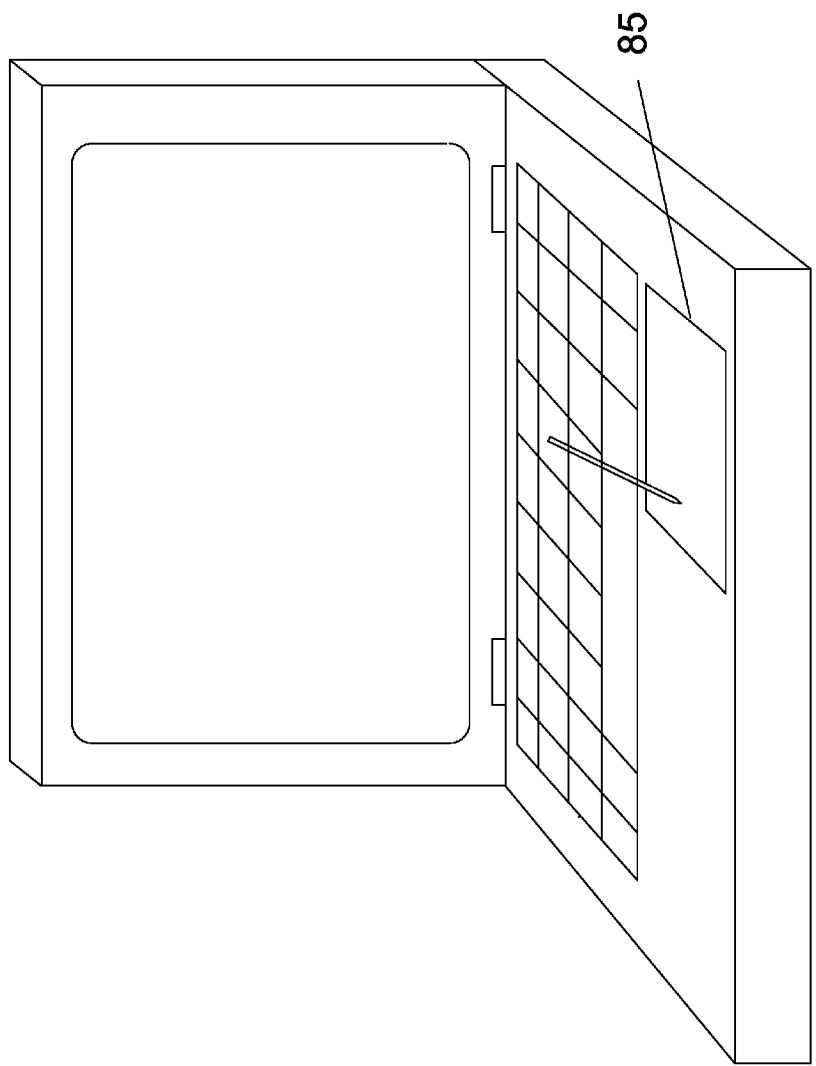
FIG. 21 is a perspective view of a portable computer having a touch panel integrated into the top surface of the portable computer base that is responsive to the positioning of a stylus, in accordance with another embodiment of the invention.

FIG. 21 shows another solution to the mouse problem which may at first glance look similar to the previous embodiment, but it is actually quite different in its functioning. The panel 85 is not necessarily sensitive to the touch of a finger (as standard touch pads in laptops customarily are), because it is not supposed to be operated with a finger. It is also different from a mouse pad, because it is not a static, passive surface like a mouse pad normally is (the intelligence in a mouse solution resides in the mouse itself, not in the pad). By contrast, the solution in FIG. 21 consists of a pointer-sensitive panel wherein the intelligence resides in the panel, not in the pointer (basically the opposite of a mouse pad). This panel 85 may be adapted to detect the position of materials such as plastic, Teflon or metal. The user can use a pen with a Teflon tip or similar passive instrument (possibly even a pencil, depending on the design of the panel) to send input to the computer. Writing and drawing panels like this already exist for the purpose of drawing or writing. The difference here is that panel 85 is programmed and adapted to communicate with the computer and its operating system by acting like a mouse, not as a drawing device.

Figure 22:
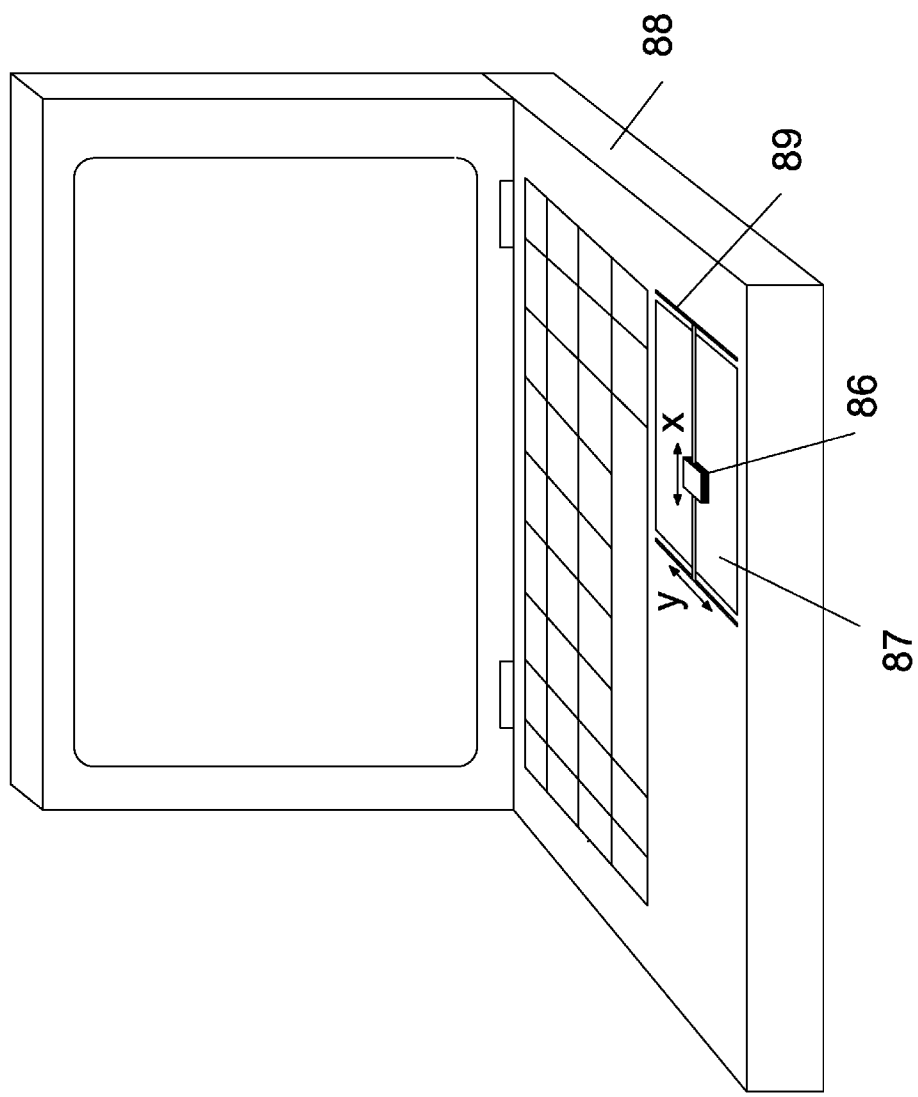
FIG. 22 is a perspective view of a portable computer having a touch panel integrated into the top surface of the portable computer base that is responsive to the positioning of a finger rest.

FIG. 22 shows another embodiment of a portable computer, with a pointing device comprised of finger rest 86 and panel 87. Panel 87 is not sensitive to the finger alone, and instead it is sensitive to a material from which finger rest 86 is constructed, such as plastic, Teflon or metal. The finger of the user rests on finger rest 86. Finger rest 86 may include a concave top surface, adapted to receive the tip of a user's finger. Finger rest 86 may also include a pointed bottom surface providing a smaller contact area with panel 87 than would otherwise be provided by a user's finger alone, thereby permitting greater pointing precision. The use of finger rest 86 can also avoid potential discomfort or even pain at the tip of the finger from prolonged use of a conventional finger-operated touch panel.

Finger rest 86 can be manually moved in any direction across the surface of panel 87. Finger rest 86 is slidably attached to computer base 88 by a linkage structure 89 that allows movement in X and Y directions, similar to the heads of conventional plotters. In alternative embodiments, mechanical linkage structure 89 is eliminated; one of finger rest 86 and panel 87 is comprised of a ferromagnetic material, while the other of finger rest 86 and panel 87 is comprised of a magnetic material, such that magnetic attraction forces cause finger rest 86 to remain in contact with panel 87.

Figure 23:
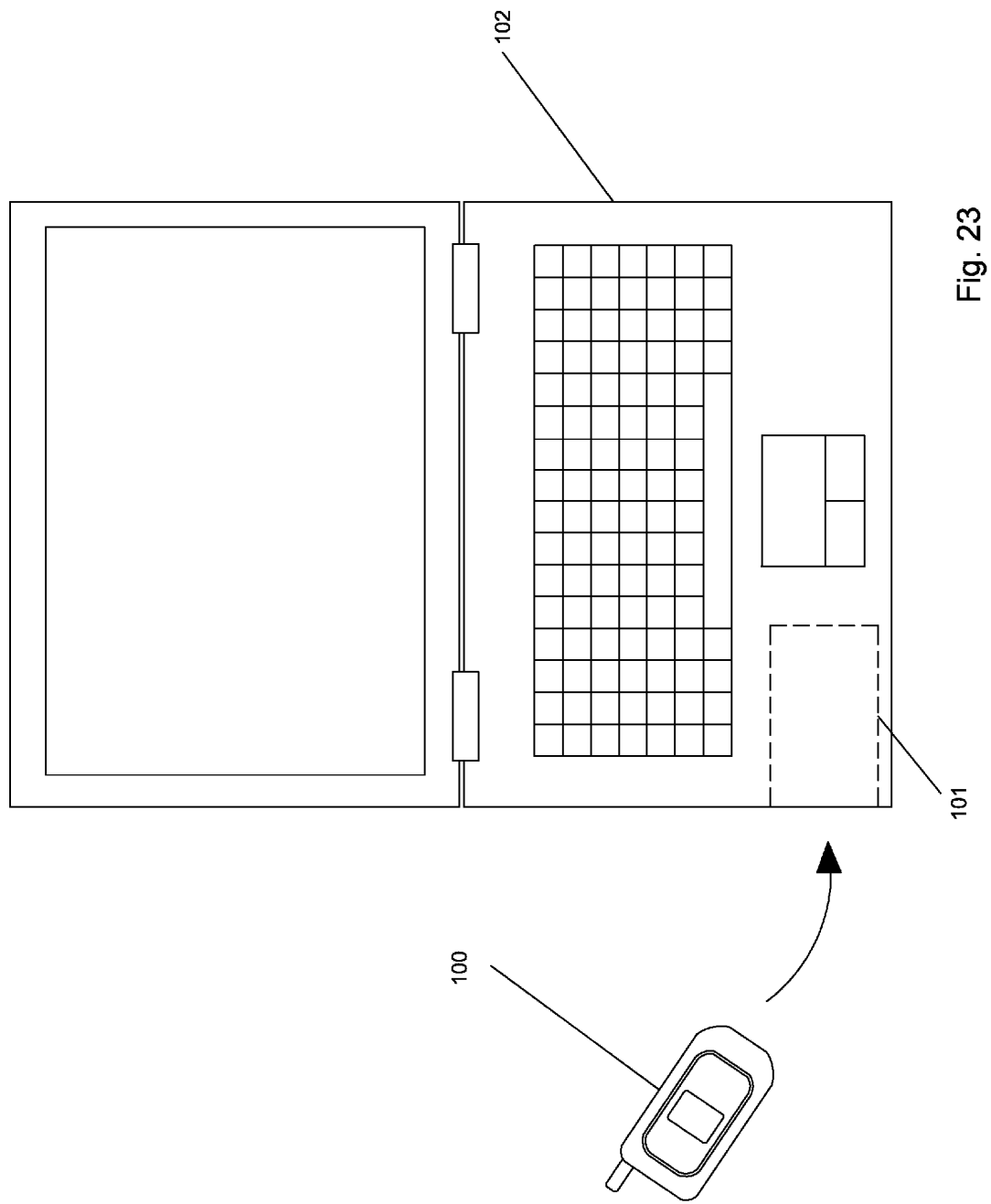
FIG. 23 is a top plan view of a portable computer having a cellular telephone receptacle, in accordance with another embodiment of the invention.

FIG. 23 shows another embodiment having a reconfiguration feature that allows a computer to connect to the Internet (and to email) via a cellular service connection, which may be desirable in areas where there is no WiFi network. Traditionally, a user can obtain a data subscription from a cellular service provider, along with a cellular data network card that plugs into a standard computer port and allows access to cellular data services, such as a connection to the Internet. One disadvantage of that solution is that many users may be reluctant to subscribe to an additional service, and carry an additional computer accessory, especially considering that users may already have a cell phone which entitles them to a certain level of data and telephony services each month. The embodiment of FIG. 23 permits such users to use existing minutes and cellular network access capabilities without having to subscribe to yet another service. Computer 102 has a cavity 101 designed to accommodate the user's cell phone 100. Once the cell phone plugged in, the computer can be reconfigured internally as a modem to tap into the cell phone service already available to the user. This extremely convenient feature may be especially attractive in conjunction with smart advanced phones like the Apple iPhone.

Figure 24:
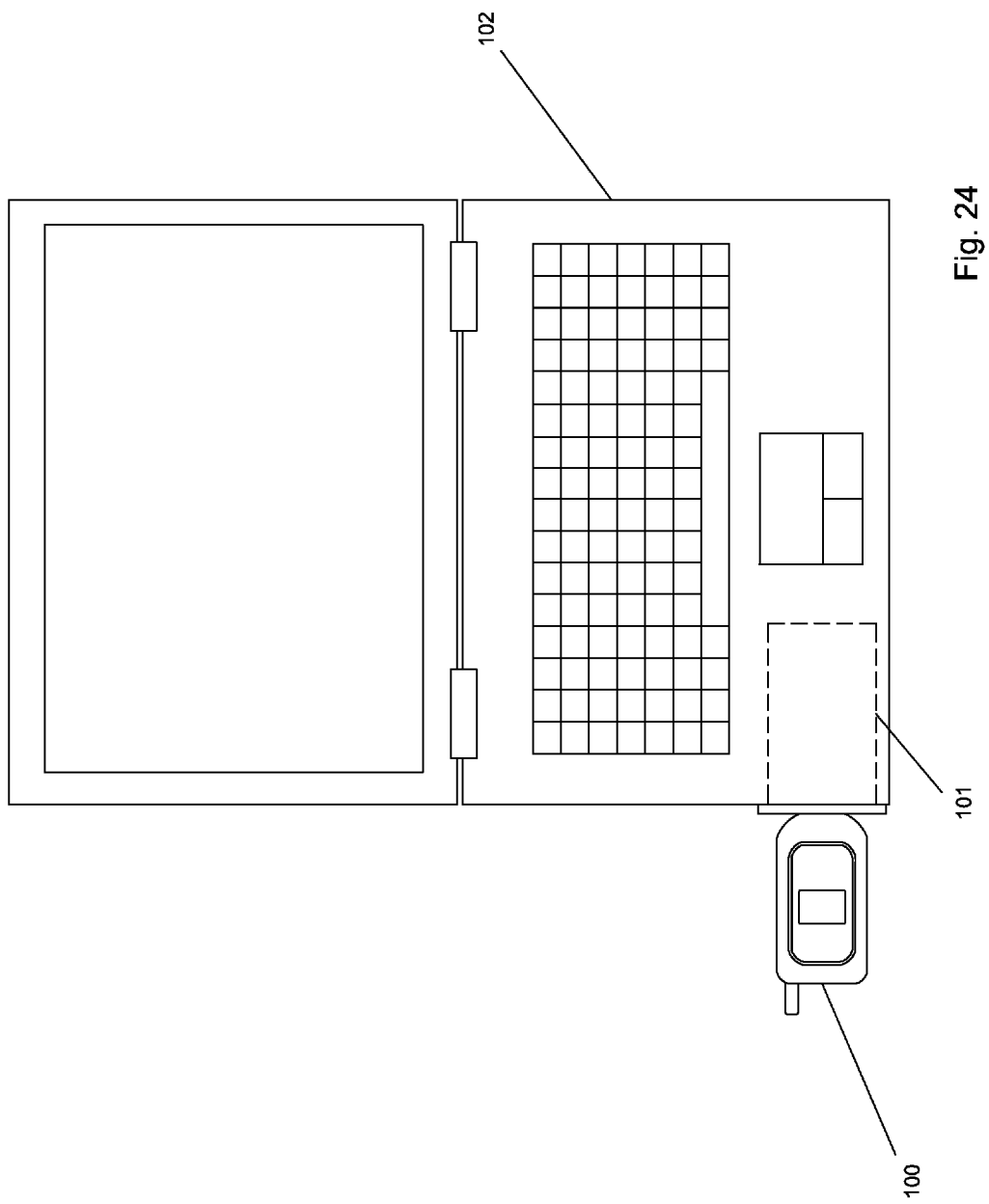
FIG. 24 is a top plan view of a portable computer having a cellular telephone receptacle with cellular telephone engaged.
Figure 25:
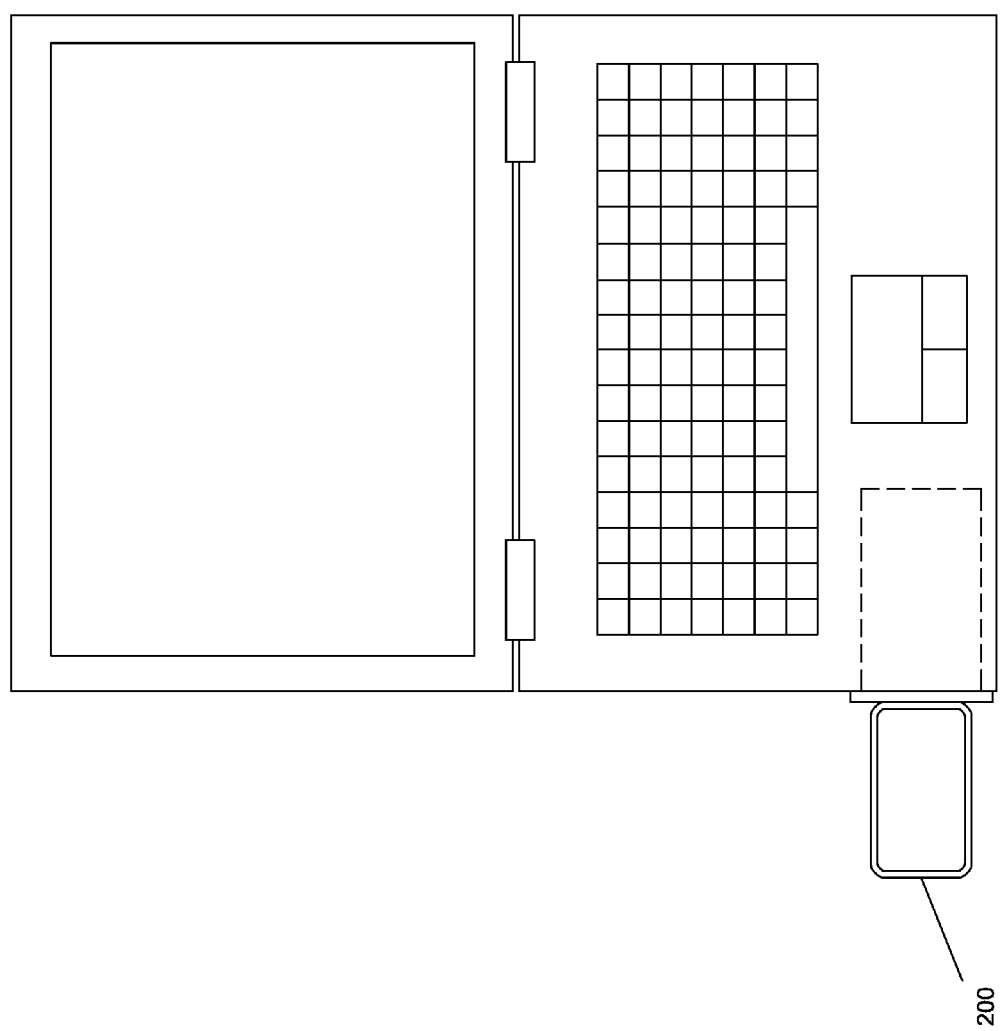
FIG. 25 is a top plan view of a portable computer having a cellular telephone receptacle with a smart cellular telephone, such as an Apple iPhone, engaged.

FIG. 24 illustrates the embodiment of FIG. 23, in which cell phone 100 has been engaged with cavity 101, providing computer 102 with access to cellular communication services through cell phone 100. FIG. 25 shows a similar configuration, in which Apple iPhone 200 plugged into a computer, such as an Apple MacBook Pro computer, to provide Internet access anywhere there is cell phone coverage.

What is claimed is:

1. A portable computer system comprising:
    a base unit;
    a base connector associated with the base unit;
    a detachable display unit capable of attachment to the base unit; and
    a support structure movably attached to the base unit for extension and retraction from the rear of the base unit.

2. The portable computer system of claim 1, in which the support structure consists of a plurality of support beams.

3. The portable computer system of claim 1, in which the support structure consists of a tray extendable from the rear of the base unit, the tray being positioned in an orientation that is approximately coplanar with the underside of the base unit.

4. A portable computer system comprising:
    a base unit;
    a display unit; and
    a tray configured to extend laterally from the side of the base unit, said tray having a top surface adapted for contact with a computer pointing device.

5. The portable computer of claim 4, further comprising:
    a computer pointing device, said computer pointing device comprising a mouse, said mouse comprising a magnet; and in which
    said tray is comprised of ferromagnetic material;
    whereby said mouse is magnetically attracted to said tray when in close proximity thereto.

6. The portable computer of claim 4, further comprising:
    a computer pointing device; and
    a mechanical linkage movably connecting said computer pointing device to said base unit in the proximity of said tray.

* * * * *